US008850494B2

(12) United States Patent
Murasugi et al.

(10) Patent No.: US 8,850,494 B2
(45) **Date of Patent: *Sep. 30, 2014**

(54) FORMING DIE ASSEMBLY FOR MICROCOMPONENTS

(75) Inventors: Narutoshi Murasugi, Matsudo (JP); Kazunori Maekawa, Matsudo (JP); Zenzo Ishijima, Matsudo (JP)

(73) Assignee: Hitachi Powdered Metals Co., Ltd, Chiba (JP)

( * ) Notice: Subject to any disclaimer, the term of this patent is extended or adjusted under 35 U.S.C. 154(b) by 338 days.

This patent is subject to a terminal disclaimer.

(21) Appl. No.: 13/279,733

(22) Filed: Oct. 24, 2011

(65) Prior Publication Data

US 2012/0107444 A1 May 3, 2012

(30) Foreign Application Priority Data

Oct. 29, 2010 (JP) ................................ 2010-243156

(51) Int. Cl.
*B29C 45/72* (2006.01)
*B29C 45/02* (2006.01)
*B30B 11/02* (2006.01)
*B22F 3/03* (2006.01)

(52) U.S. Cl.
CPC .. *B30B 11/02* (2013.01); *B22F 3/03* (2013.01)
USPC ............................................................ 725/78

(58) Field of Classification Search
CPC .................................. B30B 11/02; B22F 3/03
USPC ........................................... 425/551, 562, 78
See application file for complete search history.

(56) References Cited

U.S. PATENT DOCUMENTS 506,807 A * 10/1893 Beardsley .................... 425/352
2002/0022063 A1* 2/2002 Goransson ...................... 425/78
2006/0257279 A1 11/2006 Ishijima et al.
2012/0107434 A1* 5/2012 Murasugi et al. ............... 425/78
2012/0107445 A1* 5/2012 Murasugi et al. ............. 425/551

FOREIGN PATENT DOCUMENTS

JP A-2006-344581 12/2006
JP A-2011-088411 5/2011
JP A-2011-089192 5/2011

* cited by examiner

*Primary Examiner* — Robert J Grun
(74) *Attorney, Agent, or Firm* — Oliff PLC

(57) ABSTRACT

A forming die assembly for microcomponents includes a forming die, a plunger, and a punch. The forming die is formed with an outer die, an inner die, a storage portion formed at the inner die, and a punch hole formed at the inner die. The inner die slidably inserted into the outer die forms a part of a cavity between the inner die and the outer die. The storage portion stores a raw material with a metal powder and a binder having plasticity. The punch hole connects the cavity and the storage portion and forms a gate therebetween. The plunger slidably inserted into the storage portion fills the raw material stored in the storage portion into the cavity through the punch hole. The punch is slidably inserted into the plunger, and it closes the gate and compresses the raw material in the cavity.

4 Claims, 10 Drawing Sheets

FORMING DIE ASSEMBLY FOR MICROCOMPONENTS

BACKGROUND OF THE INVENTION

1. Technical Field

The present invention relates to a forming die assembly including dies that may be used for producing microcomponents such as microgears. In the dies, a raw material with a metal powder and a binder having plasticity is compacted into a green compact with a shape similar to that of the microcomponent.

2. Background Art

Recently, in the production of digital home appliances, advanced medical equipment, and IT devices, there are trends toward decreasing dimensions and increasing performances of the devices. Therefore, requirements for decreasing dimensions and wall thicknesses have been increasing for components of such devices. In view of this, although microcomponents basically have small dimensions and thin walls, the microcomponents are also required to be even smaller and have thinner walls. A production method for such microcomponents is disclosed in Japanese Patent Application of Laid-Open No. 2006-344581. In this method, a raw material with a metal powder and a binder having plasticity is filled in a die and is compressed by a punch, whereby a green compact with a shape similar to that of the target shape is formed. Then, the green compact is sintered.

According to the production method of the green compact disclosed in Japanese Patent Application of Laid-Open No. 2006-344581, the raw material is sufficiently filled at a portion of the die, which corresponds to a thin-walled portion of the target shape. Therefore, a green compact with high accuracy is obtained. In this case, since the raw material is different from a raw powder, which is used in an ordinary powder metallurgy process, and has plasticity, the raw material is difficult to use. That is, a predetermined amount of the raw material must be directly filled in the die, and this increases the steps in the process. The raw material is filled in the die at each compacting as is the case in an ordinary die forming for compacting a powder. However, in a case of forming a microcomponent, since the amount of raw material required for one compacting is extremely small, this production method is not efficient.

SUMMARY OF THE INVENTION

The present invention has been completed in view of the above circumstances, and an object of the present invention is to provide a forming die assembly for microcomponents. According to the forming die assembly, a raw material with a metal powder and a binder having plasticity (hereinafter called a "raw material") is easily supplied to dies and is thereby efficiently compacted, whereby a green compact is obtained.

The present invention provides a forming die assembly for microcomponents, and the forming die assembly includes a forming die, a plunger, and a punch. The forming die is formed with an outer die, an inner die, a storage portion formed at the inner die, and a punch hole formed at the inner die. The inner die is formed so as to be slidably inserted into the outer die and to form at least a part of a cavity between the inner die and the outer die. The storage portion is used to store a raw material with a metal powder and a binder having plasticity. The punch hole connects the cavity and the storage portion so as to form a gate therebetween. The plunger is formed so as to be slidably inserted into the storage portion and to fill the raw material stored in the storage portion into the cavity through the punch hole. The punch is slidably inserted into the plunger in the sliding direction of the plunger, and it opens and closes the gate by reciprocatory sliding. The punch closes the gate and compresses the raw material in the cavity into a green compact by sliding in the direction of the cavity.

According to the present invention, the raw material stored in the storage portion of the forming die is filled in the cavity by the plunger, and the raw material in the cavity is compacted into a green compact by the punch. Then, the forming die assembly is opened, whereby the green compact is obtained. By repeating the above operation, green compacts are continuously obtained. The raw material in a small amount is easily supplied to the cavity by the plunger, and the punch is not required to be pulled out, whereby the green compact is efficiently produced.

The raw material is supplied to the storage portion when the plunger is pulled out from the storage portion. The plunger and the inner die, into which the punch is inserted, may be used as a set, and plural sets may be prepared. In this case, while one set is inserted to the outer die and is operated, maintenance can be performed on the other sets of the inner die, the plunger, and the punch. Moreover, the raw material can be supplied to the storage portion of each set beforehand. Therefore, it is not required to intermit the operation for the supply of the raw material, whereby the production efficiency is more improved.

In the present invention, the forming die may be provided with an upper die and a lower die which are arranged so that they can relatively vertically make contact with each other and separate from each other. In this case, one of the upper die and the lower die may be provided with the outer die and the inner die. The cavity may be formed when the upper die and the lower die are brought into contact with each other.

In the present invention, the green compact may have a flange portion and a shaft portion, and the shaft portion may project from the flange portion.

Moreover, in the present invention, in order to improve the flowability of the raw material and to easily fill the raw material into the cavity, the forming die is preferably provided with a heating means for heating the raw material in the storage portion.

According to the present invention, a forming die assembly for microcomponents is provided, and the raw material is easily supplied to the forming die, and thereby a green compact is efficiently obtained.

PREFERRED EMBODIMENTS OF THE INVENTION

Embodiments of the present invention will be described with reference to the figures hereinafter.

1 First Embodiment 1-1 Microgear

Figure 1:
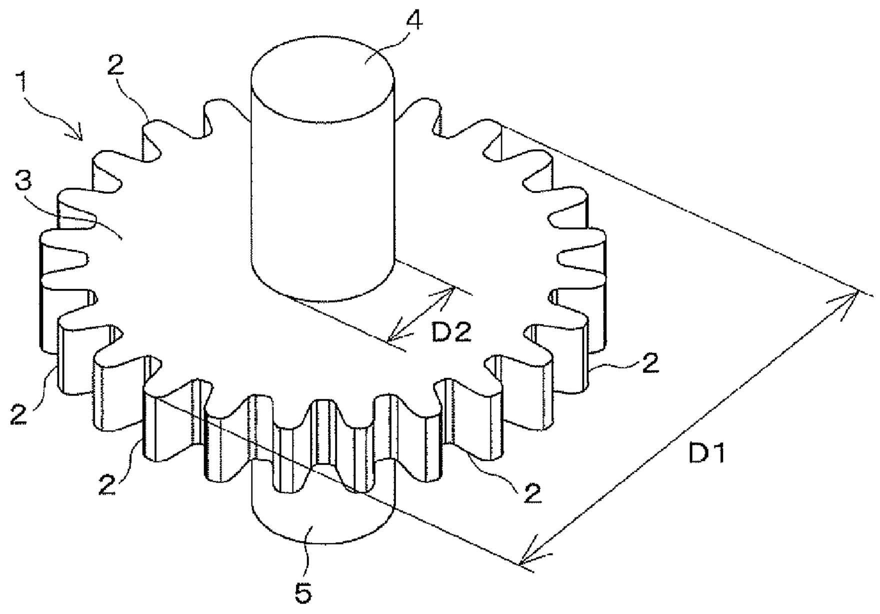
FIG. 1 is a perspective view showing a microgear obtained from a green compact that is formed by a forming die assembly of a First Embodiment of the present invention.

FIG. 1 shows a microgear (hereinafter called a "gear") of a microcomponent. The gear 1 is obtained by sintering a green compact that is formed by a forming die assembly of a First Embodiment. The gear 1 has a spur wheel portion 3 and columnar shaft portions 4 and 5 which have the same length. The spur wheel portion 3 is formed with plural teeth 2 at the outer circumferential surface thereof. Each of the shaft portions 4 and 5 perpendicularly extends on either side from the center of the spur wheel portion 3. The gear 1 may have the following dimensions. For example, the spur wheel portion 3 has an outer diameter D1 of several hundred micrometers to several millimeters, and the shaft portions 4 and 5 have a diameter D2 of several dozen to several hundred micrometers.

1-2 Forming Die Assembly (1-2-1) Structure

FIGS. 2A to 2D and FIGS. 3A to 3D show steps for forming a green compact of the gear 1 by a forming die assembly of a First Embodiment. First, the structure of the forming die assembly will be described with reference to FIGS. 2A to 2D. As shown in FIGS. 2A to 2D, a reference numeral 10 denotes a forming die, and the forming die 10 is formed of an upper die 20 and a lower die 30. The upper die 20 and the lower die 30 are vertically movably provided and are arranged so that they can relatively vertically make contact with each other and separate from each other.

Figure 4:
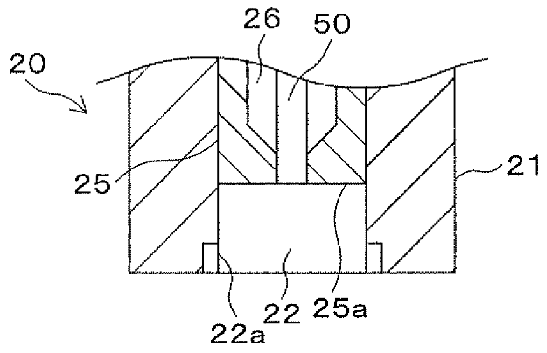
FIG. 4 is a partial cross sectional view of an upper die provided to the forming die assembly of the First Embodiment.

The upper die 20 is provided with an outer die 21 and an inner die 25. The outer die 21 and the inner die 25 have horizontal lower surfaces 21*a* and 25*a*, respectively. The outer die 21 is formed with a cylindrical hole 22 that vertically penetrates through the outer die 21, and the inner die 25 in a cylindrical shape is slidably inserted into the cylindrical hole 22. The cylindrical hole 22 has an inner circumferential surface with a shape corresponding to the shape of the teeth 2 of the spur wheel portion 3 of the gear 1. Alternately, as shown in FIG. 4, the cylindrical hole 22 may have an inner circumferential surface at the lower end portion, and this inner circumferential surface is formed with internal teeth 22*a* for forming the teeth 2 of the spur wheel portion 3 of the gear 1.

The inner die 25 has an inside that is formed with a storage portion 26 for storing a raw material, and the storage portion 26 extends in the vertical direction and has an opening at the upper side. The storage portion 26 has a cylindrical inner circumferential surface and has a tapered portion 26*a* at the lower end portion, and the tapered portion 26*a* has a conical shape that is downwardly tapered. The inner die 25 is also formed with an upper punch hole 27 at the inside and has a lower surface 25*a*. The upper punch hole 27 downwardly extends from the lower end of the tapered portion 26*a* and has an opening at the side of the lower surface 25*a*. The upper punch hole 27 is concentric with the storage portion 26, and the upper punch hole 27 and the storage portion 26 have a gate 28 therebetween. The upper punch hole 27 has an inner diameter that is set so as to be the same as the diameters of the shaft portions 4 and 5 of the gear 1.

The storage portion 26 of the inner die 25 is formed so as to be filled with a raw material P, which has plasticity, from the opening at the upper side, whereby the raw material P is stored. The raw material P may be a powder that is formed by mixing 40 to 60 volume % of a binder with a metal powder and by kneading them. The metal powder may be an iron powder, and the binder may be made of thermoplastic resin and wax.

Figures 2A, 2B, 2C, 2D:
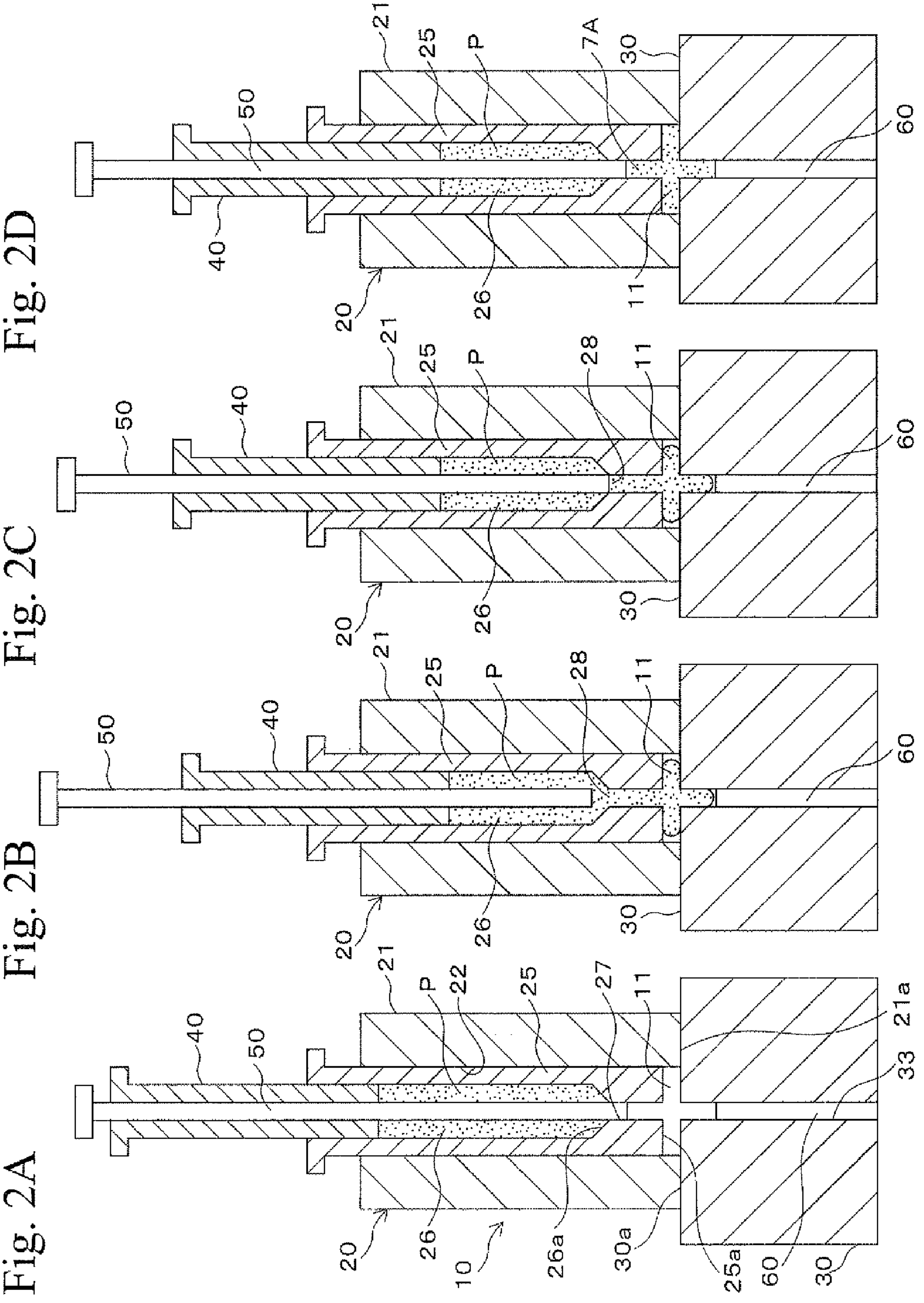
FIGS. 2A to 2D are cross sectional views showing an early part of a forming step of a green compact using the forming die assembly of the First Embodiment.

The storage portion 26 is formed so that a plunger 40 is slidably inserted thereinto from the opening at the upper side. The plunger 40 has a shaft center through which an upper punch 50 slidably penetrates in a vertical direction that is a sliding direction of the plunger 40. The upper punch 50 has a lower end portion, and the lower end portion is slidably inserted into the upper punch hole 27 when the upper punch 50 is lowered. In this case, the gate 28 is closed by the upper punch 50. By raising the upper punch 50 in a condition in which the gate 28 is closed, the upper punch 50 is pulled out from the upper punch hole 27, and the gate 28 is opened as shown in FIG. 2B.

The lower die 30 has a horizontal upper surface 30*a* that can be brought into contact with the lower surface 21*a* of the outer die 21 of the upper die 20. The lower die 30 is formed with a lower punch hole 33 that vertically extends and penetrates the lower die 30, and the lower punch hole 33 is coaxial with the upper punch hole 27. The lower punch hole 33 has the same diameter as that of the upper punch hole 27, that is, has an inner diameter corresponding to the diameters of the shaft portions 4 and 5 of the gear 1. The lower punch hole 33 is formed so that a lower punch 60 is slidably inserted thereinto.

(1-2-2) Forming Step

A forming step for a green compact of the gear 1 using the forming die assembly of the First Embodiment will be described with reference to FIGS. 2A to 2D and FIGS. 3A to 3D. First, the inner die 25 of the upper die 20 is inserted into the outer die 21 so that the internal teeth 22*a* at the lower end portion of the cylindrical hole 22 are exposed. The lower surface 21*a* of the outer die 21 and the upper surface 30*a* of the lower die 30 are brought into contact and are clamped. Then, the upper punch 50 at the side of the upper die 20 is inserted into the upper punch hole 27 so as to close the gate 28, and the lower punch 60 at the side of the lower die 30 is lowered. Thus, a cavity 11 with a cruciform section is formed in the forming die 10. The cavity 11 has a portion corresponding to the spur wheel portion 3 and the shaft portion 4 at the upper side of the gear 1 at the side of the upper die 20. The cavity 11 also has a portion corresponding to the shaft portion 5 at the lower side of the gear 1 at the side of the lower die 30. On the other hand, the raw material P is supplied to the storage portion 26 of the inner die 25 until the storage portion 26 is almost filled, and the leading end of the plunger 40 is inserted into the storage portion 26 (FIG. 2A).

Next, the upper punch 50 is raised and is pulled out from the upper punch hole 27, whereby the gate 28 is opened. Thus, the cavity 11 and the storage portion 26 are connected via the upper punch hole 27. In this condition, the plunger 40 is pressed down, whereby a necessary amount of the raw material P is filled from the gate 28 to the cavity 11 (FIG. 2B).

Then, the upper punch 50 is pressed down so as to close the gate 28, and the upper punch 50 is further pressed down so as to compact the raw material P in the cavity 11 (FIGS. 2C and 2D). Thus, the spur wheel portion 3 is formed between the inner die 25 of the upper die 20 and the lower die 30, and the shaft portions 4 and 5 are formed at the upper punch hole 27 and the lower punch hole 33, respectively. Accordingly, a green compact 1A of a gear 1 is formed.

Figures 3A, 3B, 3C, 3D:
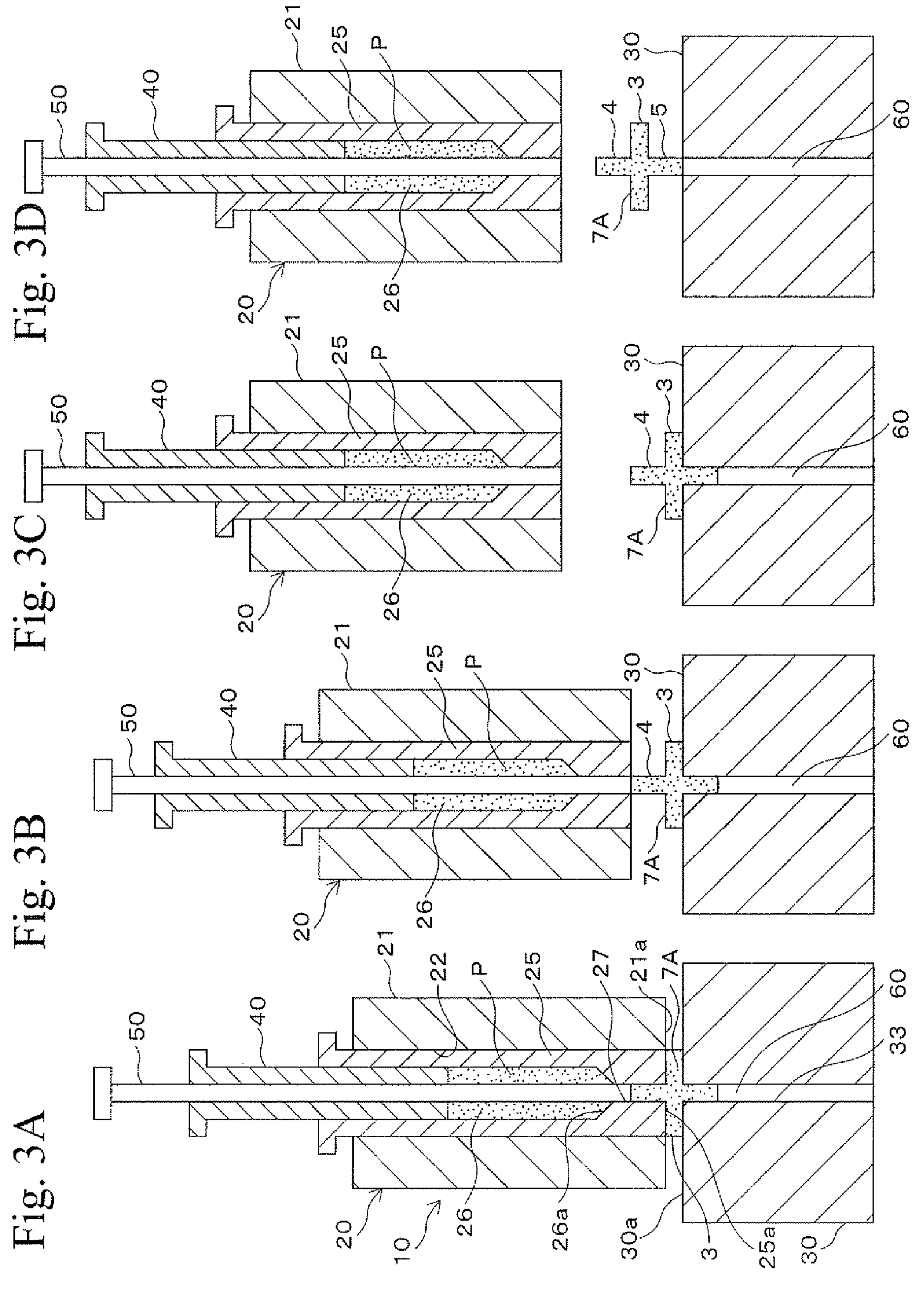
FIGS. 3A to 3D are cross sectional views showing the rest of the forming step shown in FIGS. 2A to 2D.

After the green compact 1A is formed in the forming die 10 as described above, the forming die 10 is opened so as to pull out the green compact 1A. In this case, the outer die 21 of the upper die 20 is raised so that the lower surface 21*a* is at the same level as the lower surface 25*a* of the inner die 25, whereby the spur wheel portion 3 is exposed (FIG. 3A). Then, the outer die 21 and the inner die 25 are raised while the upper punch 50 holds down the green compact 1A, whereby the shaft portion 4 at the upper side of the gear 1 is exposed (FIG. 3B). Next, the entire of the structural components at the side of the upper die 20 is raised (FIG. 3C), and the lower punch 60 is raised, whereby the shaft portion 5 at the lower side of the gear 1 is upwardly pulled out from the lower punch hole 33 (FIG. 3D).

As described above, one green compact 1A is formed by such an operation. After the green compact 1A is removed from the forming die assembly, the condition of the forming die assembly is returned to the condition shown in FIG. 2A. Then, by repeating the above operation, a green compact 1A is formed. Such forming operation of the green compact 1A is repeated until the raw material P in the storage portion 26 is used up.

(1-2-3) Effects

According to the forming die assembly of the First Embodiment, the upper punch 50 is raised so as to open the gate 28, and the raw material P stored in the storage portion 26 in the forming die 10 is filled in the cavity 11 by the plunger 40. Next, the upper punch 50 is pressed down so as to close the gate 28, and the raw material P in the cavity 11 is subsequently compacted by the upper punch 50. Then, the forming die assembly is opened, whereby a green compact 1A is obtained. By repeating this operation, green compacts 1A are successively obtained. A small amount of the raw material P is easily filled in the cavity 11 by pressing down the plunger 40 without pulling out the upper punch 50. Accordingly, even when the amount of the raw material P is small in one forming, the green compact 1A is efficiently produced.

After the raw material P in the storage portion 26 is used up, the plunger 40 is pulled out from the inner die 25, and new raw material P is supplied to the storage portion 26. Then, the plunger 40 is inserted into the inner die 25 again in order to proceed the forming operation. In this embodiment, the plunger 40 and the inner die 25, into which the upper punch 50 is inserted, may be used as a set. In this case, plural sets may be prepared, and one set is inserted into the outer die 21 and is operated. According to this manner, maintenance can be performed on the other sets of the inner die 25, the plunger 40, and the upper punch 50, while the forming die assembly is operated. Moreover, the raw material P can be supplied to each set beforehand. Therefore, it is not required to intermit the operation for the supply of the raw material P, whereby the production efficiency is more improved.

Next, a Second Embodiment and a Third Embodiment of the present invention will be described with reference to FIGS. 5, 6A to 6D, 7A to 7D, and 8, and FIGS. 9A to 9D, 10A to 10D, and 11, respectively. In these figures, structural components similar to the structural components in the First Embodiment have the same reference numerals as those of the structural components in the First Embodiment, and descriptions for these structural components are omitted or simplified.

2 Second Embodiment 2-1 Microgear

Figure 5:
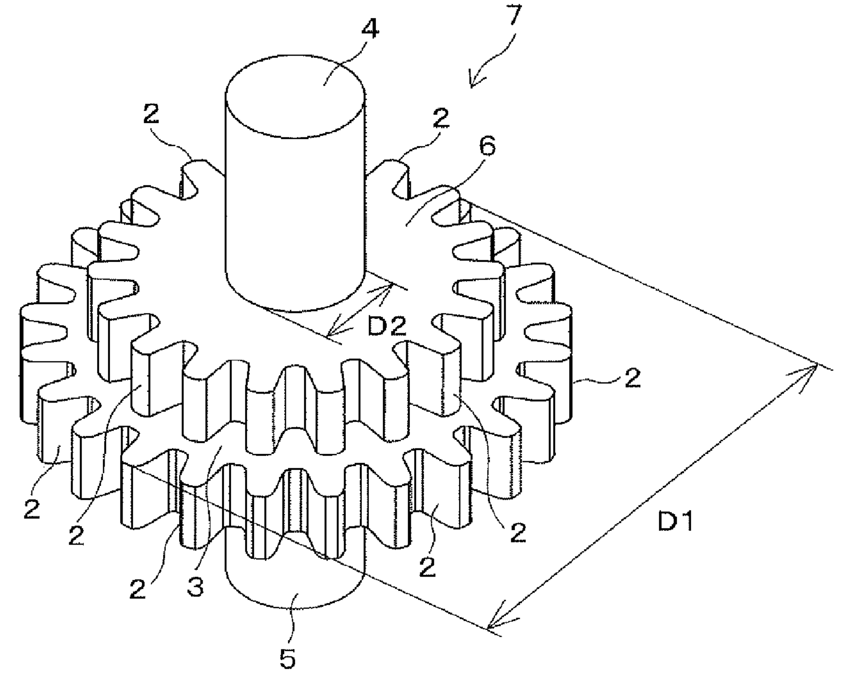
FIG. 5 is a perspective view showing a microgear obtained from a green compact that is formed by one of forming die assemblies of a Second Embodiment and a Third Embodiment of the present invention.

FIG. 5 shows a microgear of a microcomponent. The gear 7 is obtained by sintering a green compact that is formed by a forming die assembly of a Second Embodiment. The gear 7 is a two-step gear in which a spur wheel portion 6 is formed on a side (upper side in FIG. 5) of a spur wheel portion 3. The spur wheel portion 6 has a smaller diameter, and the spur wheel portion 3 has a larger diameter. The spur wheel portion 6 is formed with plural teeth 2 at the outer circumferential surface thereof. The gear 7 also has shaft portions 4 and 5. The shaft portion 4 projects from the spur wheel portion 6, and the shaft portion 5 projects from the spur wheel portion 3. The gear 7 may have the following dimensions. For example, the spur wheel portion 3 has an outer diameter D1 of several hundred micrometers to several millimeters, and the shaft portions 4 and 5 have a diameter D2 of several dozen to several hundred micrometers.

2-2 Forming Die Assembly (2-2-1) Structure

Figures 6A, 6B, 6C, 6D:
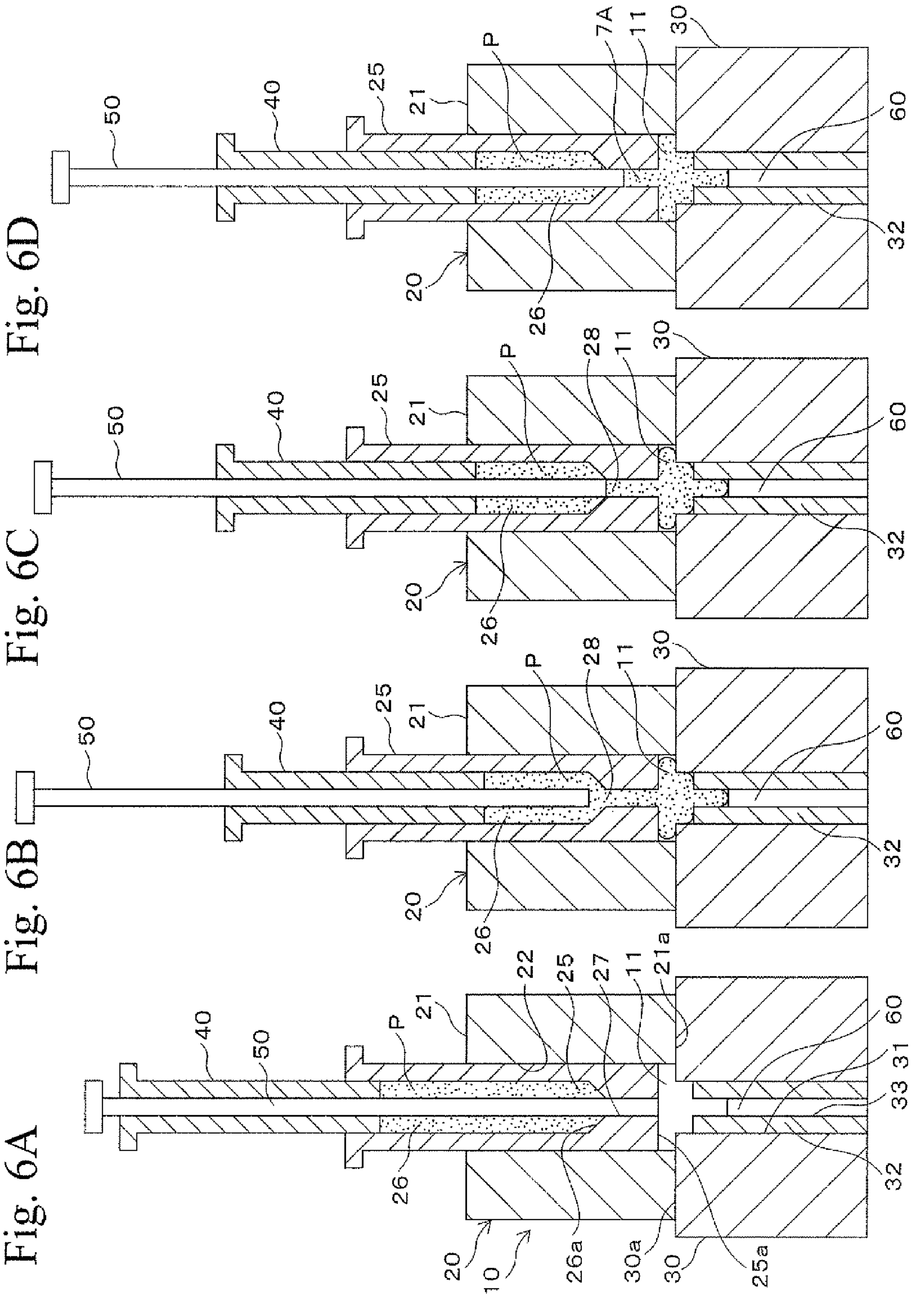
FIGS. 6A to 6D are cross sectional views showing an early part of a forming step of a green compact using the forming die assembly of the Second Embodiment.
Figures 7A, 7B, 7C, 7D:
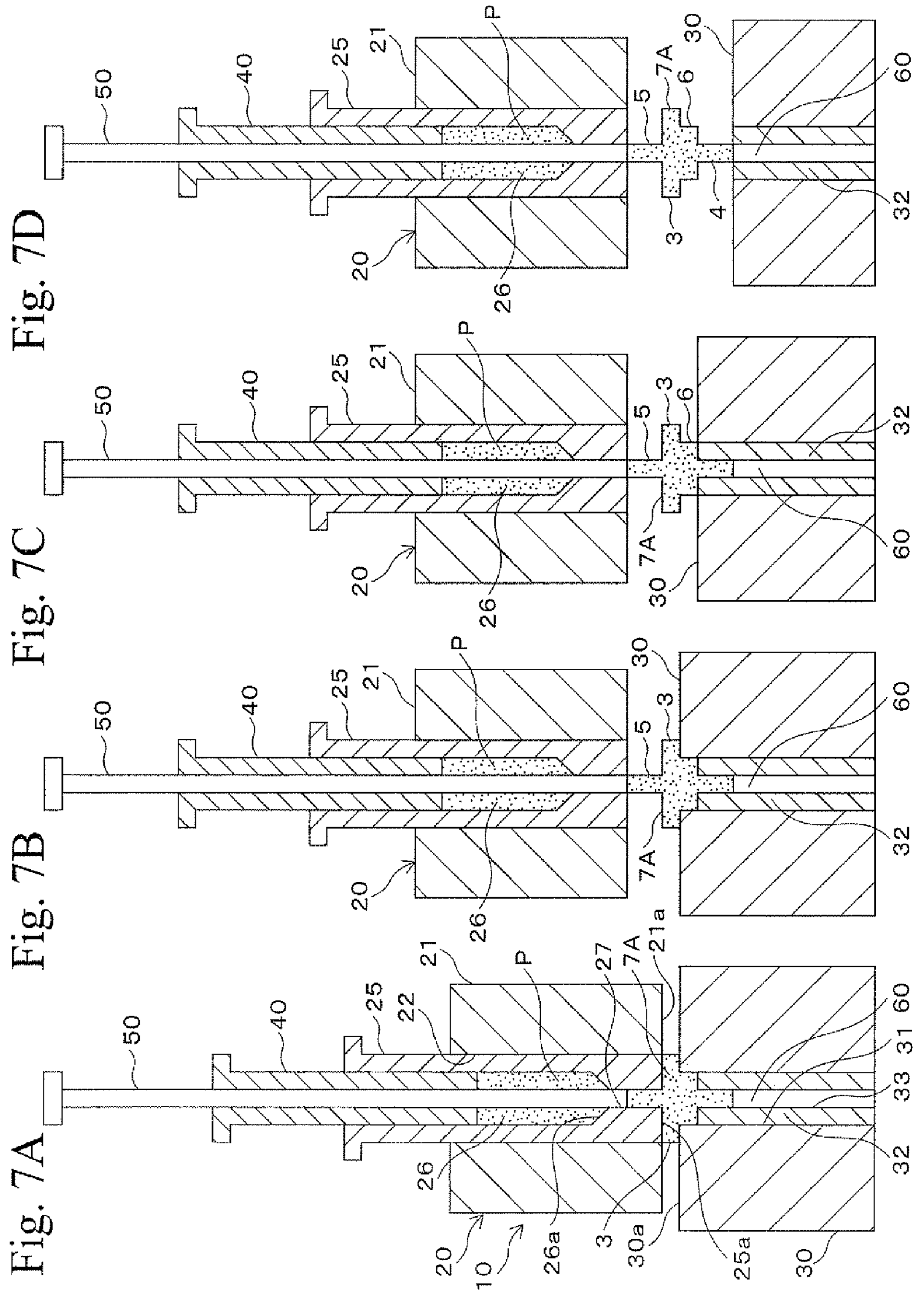
FIGS. 7A to 7D are cross sectional views showing the rest of the forming step shown in FIGS. 6A to 6D.
Figure 8:
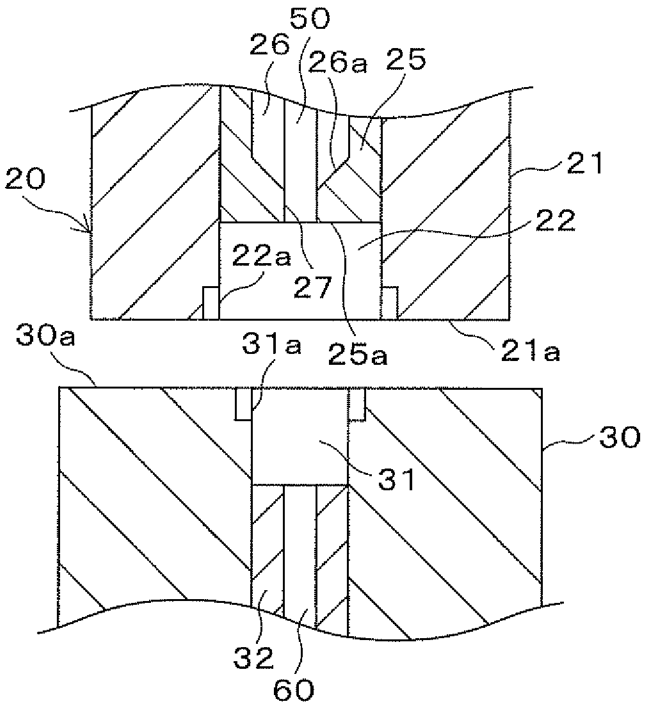
FIG. 8 is a partial cross sectional view of an upper die and a lower die provided to the forming die assembly of the Second Embodiment.

FIGS. 6A to 6D and FIGS. 7A to 7D show a forming step of a green compact of the gear 7 by the forming die assembly of the Second Embodiment. In the forming die assembly of the Second Embodiment, the cylindrical hole 22 of the outer die 21 of the upper die 20 has an inner circumferential surface with a shape corresponding to the shape of the teeth 2 of the spur wheel portion 3 of the gear 7. Alternately, as shown in FIG. 8, the cylindrical hole 22 may have an inner circumferential surface at the lower end portion that is formed with internal teeth 22*a* as is the case in the First Embodiment. The internal teeth 22*a* are used for forming the teeth 2 of the spur wheel portion 3 of the gear 7.

On the other hand, the lower die 30 is formed with a cylindrical hole 31. The cylindrical hole 31 has openings at both ends and has an inner circumferential surface with a shape corresponding to the shape of the teeth 2 of the spur wheel portion 6 of the gear 7. The cylindrical hole 31 is formed so that an inner die 32 is vertically slidably inserted thereinto. Alternately, as shown in FIG. 8, the cylindrical hole 31 may have an inner circumferential surface at the upper end portion, and this inner circumferential surface is formed with internal teeth 31*a* for forming the teeth 2 of the spur wheel portion 6 of the gear 1. The inner die 32 has a center formed with a lower punch hole 33, and the lower punch hole 33 is formed so that the lower punch 60 is slidably inserted thereinto. The inner die 32 and the lower punch 60 are coaxially arranged with the plunger 40 and the upper punch 50 at the side of the upper die 20.

(2-2-2) Forming Step

The above structural components are different from the structural components of the First Embodiment. A forming step for a green compact of the gear 7 using the forming die assembly of the Second Embodiment will be described with reference to FIGS. 6A to 6D and FIGS. 7A to 7D. First, the inner die 25 of the upper die 20 is inserted into the outer die 21 so that the internal teeth 22*a* at the lower end portion of the cylindrical hole 22 are exposed. The lower surface 21*a* of the outer die 21 and the upper surface 30*a* of the lower die 30 are brought into contact and are clamped. Then, the upper punch 50 at the side of the upper die 20 is inserted so that the lower end surface is at the same level as the lower surface 25*a* of the inner die 25, whereby the gate 28 is closed. The inner die 32 is positioned lower than the lower die 30 so as to expose the internal teeth 31*a* at the upper end portion of the cylindrical hole 31. Moreover, the lower punch 60 is lowered more than the inner die 32 so as to form a cavity 11 in the forming die 10. The cavity 11 has a portion corresponding to the spur wheel portion 3 of the gear 7 at the side of the upper die 20. The cavity 11 also has a portion corresponding to the spur wheel portion 6 and the shaft portion 4 of the gear 7 at the side of the lower die 30. On the other hand, the raw material P is supplied to the storage portion 26 of the inner die 25 until the storage portion 26 is almost filled, and the leading end of the plunger 40 is inserted into the storage portion 26 (FIG. 6A).

Next, the upper punch 50 is raised and is pulled out from the upper punch hole 27, whereby the gate 28 is opened. Thus, the cavity 11 and the storage portion 26 are connected via the upper punch hole 27. The upper punch hole 27 functions as a part of the cavity 11. In this condition, the plunger 40 is pressed down, whereby a necessary amount of the raw material P is filled from the gate 28 to the cavity 11 with a cruciform section including the upper punch hole 27 (FIG. 6B).

The upper punch 50 is pressed down so as to close the gate 28, and the upper punch 50 is further pressed down so as to compact the raw material P in the cavity 11 (FIGS. 6C and 6D). Thus, the spur wheel portion 3 and the shaft portion 5 are formed at the side of the upper die 20, and the spur wheel portion 6 and the shaft portion 4 are formed at the side of the lower die 30. Accordingly, a green compact 7A of the gear 7 is formed.

The forming die 10 is opened so as to pull out the green compact 7A. First, the outer die 21 of the upper die 20 is raised so as to expose the spur wheel portion 3 (FIG. 7A). Then, while the upper punch 50 holds down the green compact 7A, the outer die 21 and the inner die 25 are raised so as to expose the shaft portion 5 (FIG. 7B). The lower die 30 is lowered as to the expose the spur wheel portion 6 (FIG. 7C). Moreover, the lower die 30 and the inner die 32 are further lowered, whereby the shaft portion 4 is pulled out from the lower punch hole 33 (FIG. 7D). After the entire of the structural components at the side of the upper die 20 is raised, the green compact 7A is removed from the forming die assembly. As described above, one green compact 7A is formed by such an operation. After the green compact 7A is removed from the forming die assembly, the condition of the forming die assembly is returned to the condition shown in FIG. 6A. Then, by repeating the above operation, plural green compacts 7A are obtained.

3 Third Embodiment

3-1 Microgear

The forming die assembly of the Third Embodiment can be also used for forming the green compact of the gear 7 shown in FIG. 5.

3-2 Forming Die Assembly (3-2-1)

Figures 9A, 9B, 9C, 9D:
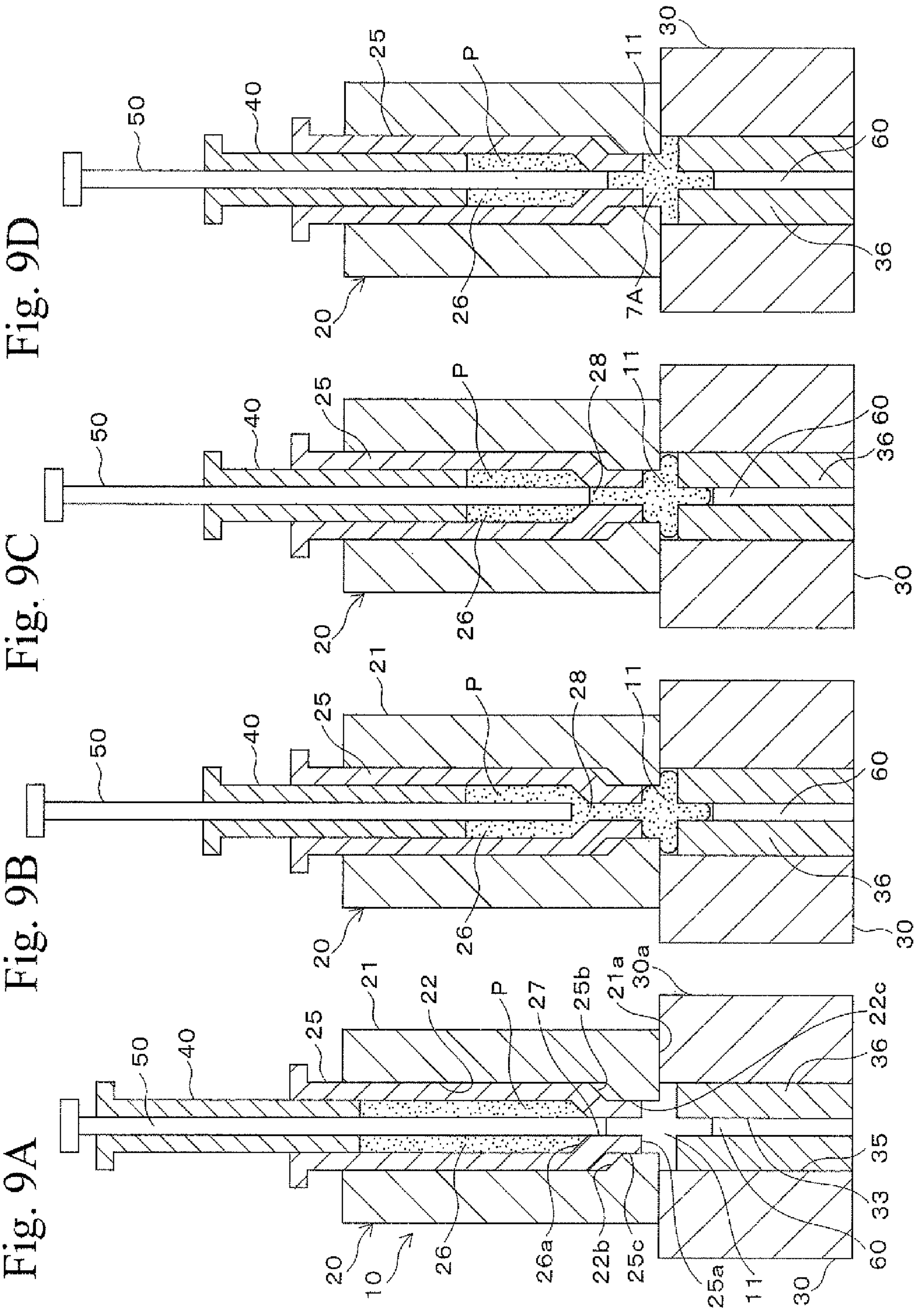
FIGS. 9A to 9D are cross sectional views showing an early part of a forming step of a green compact using the forming die assembly of the Third Embodiment.
Figures 10A, 10B, 10C, 10D:
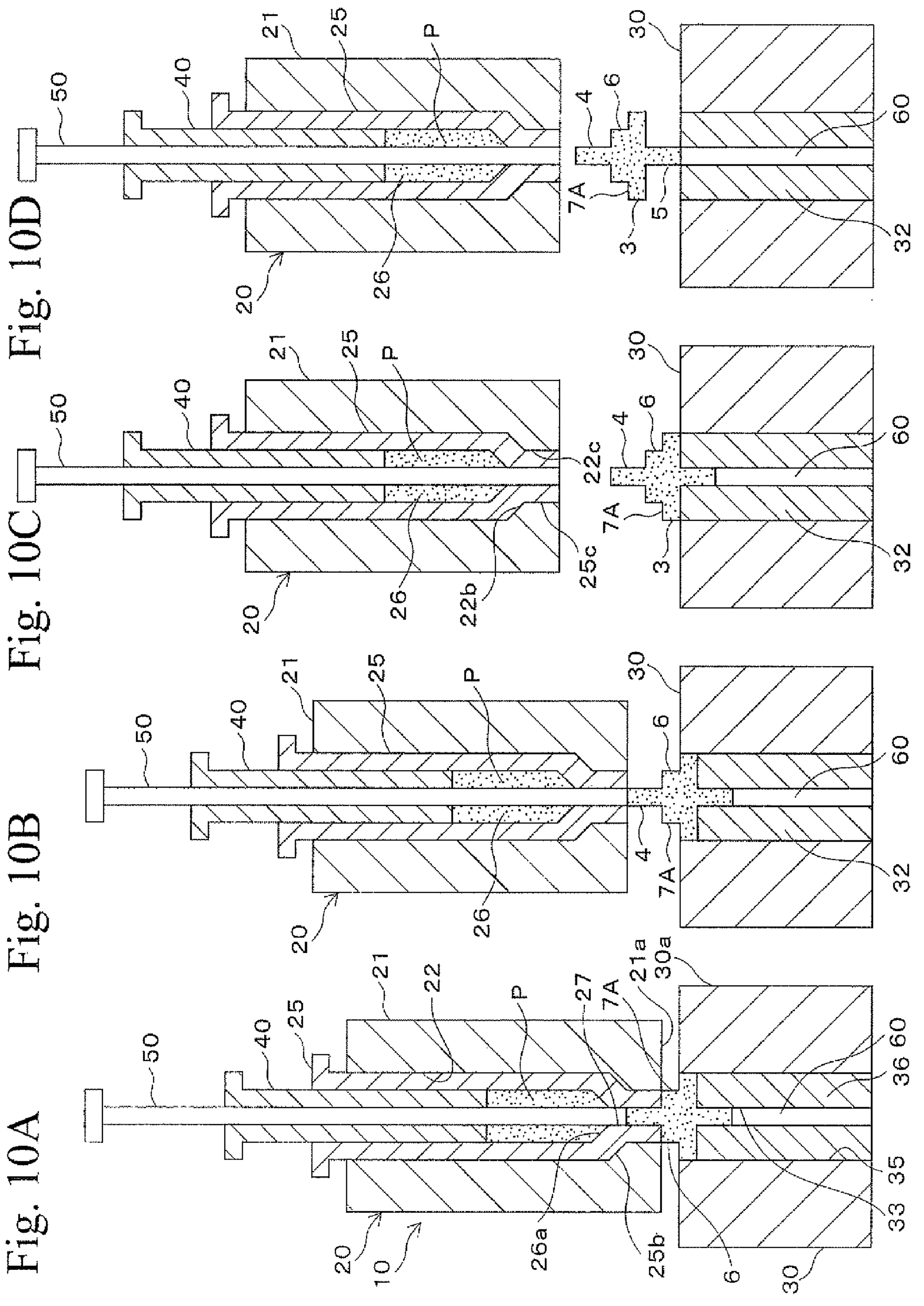
FIGS. 10A to 10D are cross sectional views showing the rest of the forming step shown in FIGS. 9A to 9D.
Figure 11:
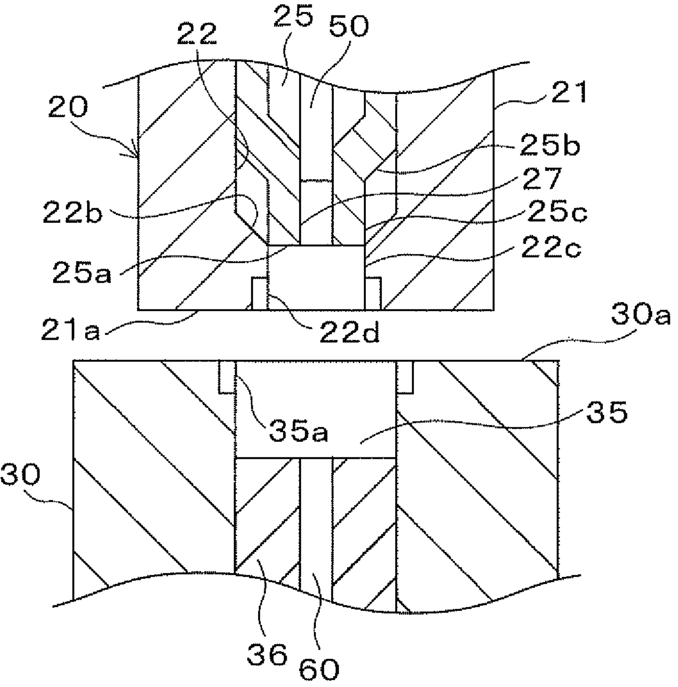
FIG. 11 is a partial cross sectional view of an upper die and a lower die provided to the forming die assembly of the Third Embodiment.

FIGS. 9A to 9D and FIGS. 10A to 10D show a forming step of a green compact of the gear 7 by the forming die assembly of the Third Embodiment. In the forming die assembly of the Third Embodiment, the cylindrical hole 22 of the outer die 21 of the upper die 20 has a lower end portion. This lower end portion is reduced in the diameter via a tapered portion 22*b* and is formed with a smaller diameter portion 22*c*. The inner die 25, which is formed so as to be slidably inserted into the cylindrical hole 22, has a lower end portion. This lower end portion is reduced in the outer diameter via a tapered portion 25*b* and is formed with a smaller diameter portion 25*c* so as to correspond to the shape of the lower end portion of the cylindrical hole 22. The smaller diameter portion 25*c* is formed so as to be slidably inserted into the smaller diameter portion 22*c* of the cylindrical hole 22. As shown in FIG. 11, the smaller diameter portion 22*c* at the side of the upper die 20 has an inner circumferential surface, which is formed with internal teeth 22*d* for forming the teeth 2 of the spur wheel portion 6 of the gear 7.

The lower die 30 of the Third Embodiment is formed with a cylindrical hole 35, which has openings at both ends and has an inner circumferential surface with a shape corresponding to the shape of the teeth 2 of the spur wheel portion 3 of the gear 7. The cylindrical hole 35 is formed so that an inner die 36 is vertically slidably inserted thereinto. Alternately, as shown in FIG. 11, the cylindrical hole 35 may have an inner circumferential surface at the upper end portion, and this inner circumferential surface is formed with internal teeth 35*a* for forming teeth 2 of the spur wheel portion 3. The inner die 36 is formed with a lower punch hole 33, and the lower punch hole 33 vertically extends and is formed so that the lower punch 60 is slidably inserted thereinto. The inner die 36 and the lower punch 60 are coaxially arranged with the plunger 40 and the upper punch 50 at the side of the upper die 20.

(3-2-2) Forming Step

A forming step for a green compact of the gear 7 using the forming die assembly of the Third Embodiment will be described with reference to FIGS. 9A to 9D and FIGS. 10A to 10D. First, the inner die 25 of the upper die 20 is inserted into the outer die 21 so that the internal teeth 22*d* at the lower end portion of the cylindrical hole 22 are exposed. The lower surface 21*a* of the outer die 21 and the upper surface 30*a* of the lower die 30 are brought into contact and are clamped. Then, the upper punch 50 at the side of the upper die 20 is inserted into the upper punch hole 27 so as to close the gate 28. The inner die 36 is positioned lower than the lower die 30 so as to expose the internal teeth 35*a* at the upper end portion of the cylindrical hole 35. Moreover, the lower punch 60 is lowered more than the inner die 36 so as to form a cavity 11 in the forming die 10. The cavity 11 has a portion corresponding to the spur wheel portion 6 and the shaft portion 4 of the gear 7 at the side of the upper die 20. The cavity 11 also has a portion corresponding to the spur wheel portion 3 and the shaft portion 5 of the gear 7 at the side of the lower die 30. On the other hand, the raw material P is supplied to the storage portion 26 of the inner die 25 until the storage portion 26 is almost filled, and the leading end of the plunger 40 is inserted into the storage portion 26 (FIG. 9A).

Next, the upper punch 50 is raised and is pulled out from the upper punch hole 27, whereby the gate 28 is opened. Thus, the cavity 11 and the storage portion 26 are connected via the upper punch hole 27. In this condition, the plunger 40 is pressed down, whereby a necessary amount of the raw material P is filled from the gate 28 to the cavity 11 (FIG. 9B).

The upper punch 50 is pressed down so as to close the gate 28, and the upper punch 50 is further pressed down so as to compact the raw material P in the cavity 11 (FIGS. 9C and 9D). Thus, the spur wheel portion 6 and the shaft portion 4 are formed at the side of the upper die 20, and the spur wheel portion 3 and the shaft portion 5 are formed at the side of the lower die 30. Accordingly, a green compact 7A of the gear 7 is formed.

The forming die 10 is opened so as to pull out the green compact 7A. First, the outer die 21 of the upper die 20 is raised so as to expose the spur wheel portion 6 (FIG. 10A). Then, while the upper punch 50 holds down the green compact 7A, the outer die 21 and the inner die 25 are raised so as to expose the shaft portion 4 (FIG. 10B). After the entire of the structural components at the side of the upper die 20 is raised (FIG. 10C), the lower punch 60 is raised, whereby the shaft portion 5 is upwardly pulled out from the lower punch hole 33 (FIG. 10D). As described above, one green compact 7A is formed by the operation. After the green compact 7A is removed from the forming die assembly, the condition of the forming die assembly is returned to the condition shown in FIG. 9A. Then, by repeating the above operation, plural green compacts 7A are obtained.

4 Effects of the Second Embodiment and the Third Embodiment

According to the Second Embodiment and the Third Embodiment, a green compact 7A of a gear 7 having two wheel portions and shafts is obtained. In this case, the gear 7 has a spur wheel portion 3 and a spur wheel portion 6 which are coaxially arranged, and the spur wheel portion 3 has a larger diameter and the spur wheel portion 6 has a smaller diameter. In the Second Embodiment and the Third Embodiment, as in the case in the First Embodiment, the raw material P is easily supplied to the forming die 10, whereby a green compact is efficiently obtained. In addition, the plunger 40 and the inner die 25, into which the upper punch 50 is inserted, may be used as a set, and plural sets may be prepared so as to efficiently perform maintenance of the set and to efficiently supply the raw material P.

5 Variations of the Present Invention

In the above embodiments, a gear is formed as a microcomponent, which has shaft portions at both sides of a spur wheel portion. In addition to the microcomponent having the shaft portions at both sides of the spur wheel portion, a microcomponent having the shaft portion at one side of the spur wheel portion may be formed. Alternately, a microcomponent having only the spur wheel portion may be formed. On the other hand, a microcomponent may be formed so as to have shaft portions at both sides of a simple disc-shaped flange portion instead of the spur wheel portion. In this case, a microcomponent may be formed so as to have a shaft portion at one side of the flange portion. Moreover, a microcomponent in a simple disc shape may be formed.

Furthermore, the upper die 20 having the storage portion 26 is preferably provided with a heating means for heating the raw material P in the storage portion 26. By heating the raw material P with this heating means, the flowability of the raw material P is increased, and filling of the raw material P into the cavity is smoothly and sufficiently performed. In this case, the heating temperature is set to be approximately the softening point of the thermoplastic resin added to the binder of the raw material P. It should be noted that the heating means may be provided at both the upper die 20 and at the lower die 30 to heat the cavity.

What is claimed is:

1. A forming die assembly for microcomponents, comprising:

a forming die formed with an outer die, an inner die, a storage portion formed at the inner die, and a punch hole formed at the inner die, the inner die being formed so as to be slidably inserted into the outer die and to form at least a part of a cavity between the inner die and the outer die, the storage portion being used to store a raw material with a metal powder and a binder having plasticity, and the punch hole connecting the cavity and the storage portion so as to form a gate therebetween;

a plunger formed so as to be slidably inserted into the storage portion and to fill the raw material stored in the storage portion into the cavity through the punch hole; and a punch slidably inserted into the plunger in the sliding direction of the plunger and opening and closing the gate by reciprocatory sliding, the punch closing the gate and compressing the raw material in the cavity into a green compact by sliding in the direction of the cavity.

2. The forming die assembly for microcomponents according to claim 1, wherein the forming die is provided with an upper die and a lower die which are arranged so that they can relatively vertically make contact with each other and separate from each other, one of the upper die and the lower die is provided with the outer die and the inner die, and the cavity is formed when the upper die and the lower die are brought into contact with each other.

3. The forming die assembly for microcomponents according to claim 1, wherein the green compact has a flange portion and a shaft portion, and the shaft portion projects from the flange portion.

4. The forming die assembly for microcomponents according to claim 1, wherein the forming die is provided with a heating means for heating the raw material in the storage portion.

* * * * *